A. MATTERN.
EGG BEATER.
APPLICATION FILED JULY 24, 1909.
964,291. Patented July 12, 1910.
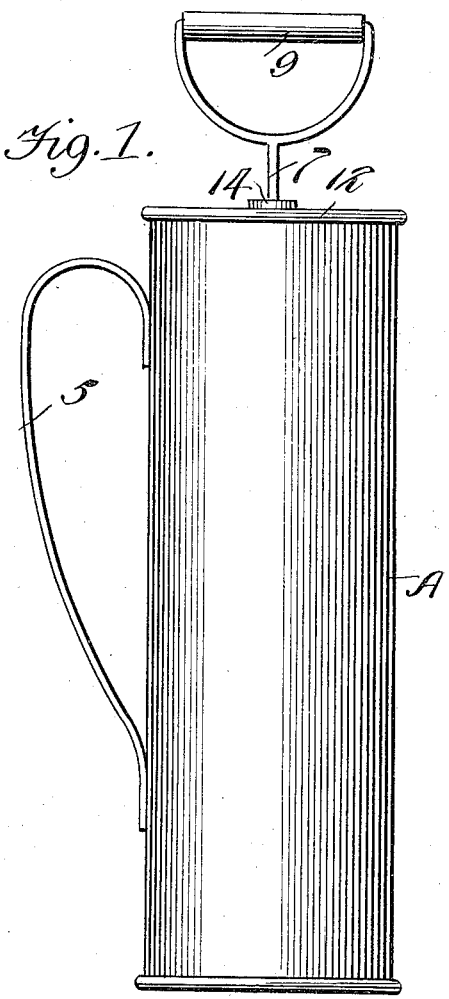
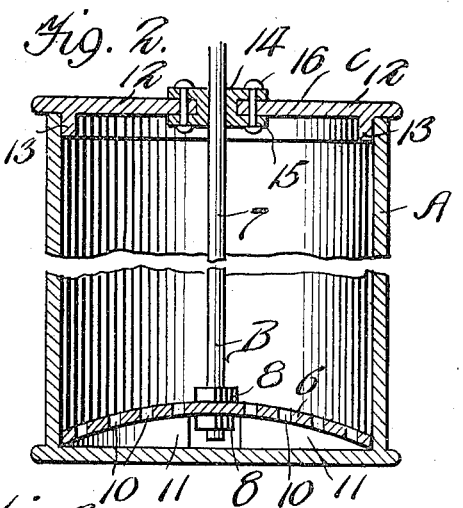
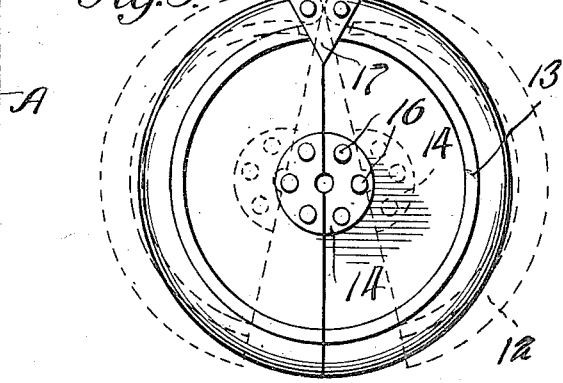
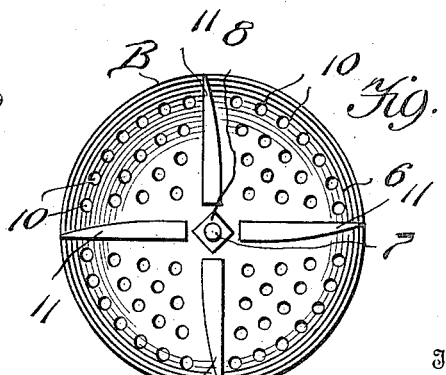
Witnesses
Hugh H. Ott
Wm Bagger
Inventor
August Mattern
By Victor J. Evans
Attorney

UNITED STATES PATENT OFFICE.

AUGUST MATTERN, OF BALTIMORE, MARYLAND.

EGG-BEATER.

964,291.   Specification of Letters Patent.   Patented July 12, 1910.

Application filed July 24, 1909. Serial No. 509,306.

*To all whom it may concern:*

Be it known that I, AUGUST MATTERN, a citizen of the United States, residing at Baltimore, in the State of Maryland, have invented new and useful Improvements in Egg-Beaters, of which the following is a specification.

This invention relates to that class of culinary devices which are generally known by the name of egg beaters and which are utilized for beating eggs, for whipping or frothing the whites of eggs, for creaming or beating as well as for mixing various materials, for crushing and creaming pie fruits and fillings, and for other like purposes.

The invention has for its objects to provide a device of this class which shall be simple in construction, thoroughly effective in operation, and which may be easily and conveniently cleansed, and kept in a sanitary condition.

With these and other ends in view which will readily appear as the nature of the invention is better understood the same consists in the improved construction and novel arrangement and combination of parts which will be hereinafter fully described and particularly pointed out in the claims.

In the accompanying drawings has been illustrated a simple and preferred form of the invention; it being however understood that no limitation is necessarily made to the precise structural details therein exhibited, but that changes, alterations and modifications within the scope of the invention, may be resorted to when desired.

In the drawings: Figure 1 is a side elevation of a device constructed in accordance with the invention. Fig. 2 is a vertical sectional view, a portion intermediate the ends of the device having been broken away. Fig. 3 is a bottom plan view of the lid or cover of the device. Fig. 4 is a bottom plan view showing the under side of the dasher.

Corresponding parts in the several figures are denoted by like characters of reference.

The improved implement comprises a can or casing A which is preferably of cylindrical shape and which may be made of any suitable dimensions. Said can is provided at one side with a handle 5 which is securely attached thereto and by means of which it may be conveniently held.

The dasher B is composed of a circular disk 6 having a stem 7 securely attached thereto by means of nuts 8, said stem being provided with a handle 9 whereby the dasher may be conveniently manipulated. The disk 6 is provided with apertures 10 which may be of any desired size and shape and which may be disposed in any convenient manner. The disk 6 is provided upon its under surface with a plurality of radial ribs 11 adapted to engage the bottom of the can for the purpose of removing material adhering to the latter by a circular scraping motion imparted to the disk 6 by rotating the stem 7 upon its axis.

The lid C of the device is composed of two semi-circular members 12 each having a downwardly extending flange 13 adapted to engage the interior of the can adjacent to the upper edge of the latter. Each of the members 12 is equipped with a semi-circular box or bearing member 14 having a groove 15 whereby it is fitted upon the member 12 to which it may be secured by means of rivets 16, the members 14, when the lid is in position, combine to form a bearing for the dasher stem 7 which latter may be reciprocated or rotated in said bearing as may be required. The members 12 of the lid are pivotally connected with a connecting member consisting of a block 17 to enable said members, when the lid is detached from the can, to be separated sufficiently to permit the dasher to be detached from the lid.

From the foregoing description, taken in connection with the drawing hereto annexed, the operation and advantages of this invention will be readily understood. The device may be made of various sizes, suitable for bakeries and by factories as well as for family use. The material to be beaten is placed in the can after which the dasher and the lid are applied as will be seen in Fig. 1. The device may now be held by the handle 5 with one hand, while the dasher is being reciprocated with the other, until the desired result has been attained after which the contents may be readily removed from the can by using the dasher as a scraper. The ribs 11 upon the under side of the dasher will engage the bottom of the can from which adhering material may thus be easily and thoroughly removed. The parts of the device, when separated, may be easily and thoroughly cleaned by washing with hot water, and it is thus evident that the device may be kept in a thoroughly sanitary condition.

Having thus described the invention, what is claimed is—

1. In a device of the character described, a can, a dasher comprising a perforated disk having radial scrapers upon its under side, a stem and nuts securing the disk upon the stem, and a lid having a flange tightly engaging the can and provided with a bearing for the dasher stem.

2. In a device of the character described, a can, a lid for the same comprising two semi-circular members pivotally connected with a connecting block, half-boxes having grooves engaging the edges of the lid members upon which said half-boxes are firmly secured; and a dasher having a stem movably supported in the bearing formed by the half-boxes.

3. A beating and mixing device comprising a can of cylindrical shape, a dasher including a stem equipped with a dished disk concaved upon its underside and provided upon its underside with radial ribs having straight bottom edges to engage the bottom of the can, and a lid for the can comprising two semi-spherical members pivotally connected with a connecting block, and half-boxes having grooves engaging the edges of the lid members upon which said half-boxes are firmly secured, said half-boxes affording a bearing for the dasher stem.

In testimony whereof I affix my signature in presence of two witnesses.

AUGUST MATTERN.

Witnesses:
JOSEPH ROTH,
J. A. MACSKI.